(12) United States Patent
Kuan

(10) Patent No.: US 11,369,899 B2
(45) Date of Patent: Jun. 28, 2022

(54) FIXING DEVICE AND A WATER FILTER HAVING THE SAME

(71) Applicant: WTI HEALTH TECH. CO., LTD., Taipei (TW)

(72) Inventor: Kuo-Wei Kuan, Taipei (TW)

(73) Assignee: WTI HEALTH TECH. CO., LTD., Taipei (TW)

( * ) Notice: Subject to any disclaimer, the term of this patent is extended or adjusted under 35 U.S.C. 154(b) by 580 days.

(21) Appl. No.: 16/268,751

(22) Filed: Feb. 6, 2019

(65) Prior Publication Data

US 2020/0129893 A1    Apr. 30, 2020

(30) Foreign Application Priority Data

Oct. 26, 2018  (TW) .................................. 107214562

(51) Int. Cl.
*B01D 29/96*  (2006.01)
*C02F 1/00*   (2006.01)
*F16B 7/22*   (2006.01)
*F16B 7/04*   (2006.01)

(52) U.S. Cl.
CPC .............. *B01D 29/96* (2013.01); *C02F 1/001* (2013.01); *F16B 7/0426* (2013.01); *F16B 7/22* (2013.01); *B01D 2201/4023* (2013.01); *C02F 2201/004* (2013.01)

(58) Field of Classification Search
None
See application file for complete search history.

(56) References Cited

U.S. PATENT DOCUMENTS

| 4,272,871 A * | 6/1981 | Weinhold ................ F16L 33/12 |
| | | 24/270 |
| 4,382,570 A * | 5/1983 | Craig .................... F16L 3/1008 |
| | | 24/270 |
| 2011/0163541 A1* | 7/2011 | Bronnert ................ F16L 23/06 |
| | | 285/365 |
| 2017/0056798 A1* | 3/2017 | Saccoccio ............. B01D 29/21 |

FOREIGN PATENT DOCUMENTS

CN           204745799 U    11/2015

* cited by examiner

*Primary Examiner* — Jonathan M Peo
(74) *Attorney, Agent, or Firm* — Hamre, Schumann, Mueller & Larson, P.C.

(57) ABSTRACT

A fixing device is adapted for installing on a water filter which includes a base seat and an outer shell. The fixing device includes first and second curved members adapted to be clipped on a junction between the base seat and the outer shell, and a fixing module. The fixing module includes a hook member and a fastener unit that includes a handle member and a ring member which is removably engaged with the hook member. The handle member is pivotable between a fastened position and a released position, where the ring member is permitted to be disengaged from the hook member to release the first and second curved members from the junction between the base seat and the outer shell. A water filter including the fixing device is also provided.

6 Claims, 7 Drawing Sheets

FIXING DEVICE AND A WATER FILTER HAVING THE SAME

CROSS-REFERENCE TO RELATED APPLICATION

This application claims priority of Taiwanese Patent Application No. 107214562, filed on Oct. 26, 2018.

FIELD

The disclosure relates to a water filter, more particularly to a water filter having a fixing member.

BACKGROUND

Tap water received in residential homes has often been transported across far distances, which increases the risk of contamination resulting from old or damaged water pipes in the transport pipeline. Thus, many families would install a water filter in their homes to filter undesirable substances, such as heavy metal or other chemicals, from the water before the water is boiled for drinking. A filter cartridge in a water filter must be changed regularly to ensure proper filtration of the water.

Referring to FIG. 1, a conventional water filter 9 includes a base seat 91, an outer shell 92 and a fixing device 93. A filter cartridge (not shown) is installed within the base seat 91 and the outer shell 92. When the filter cartridge needs replacing, the fixing device 93 must be loosened to allow the base seat 91 and the outer shell 92 to decouple so that the filter cartridge can be extracted from the base seat 91 and the outer shell 92. The fixing device 93 includes a metal ring 932 with two ends secured using a threaded member 931, and is inconvenient to dismantle each time the filter cartridge needs replacing.

SUMMARY

Therefore, in a first aspect, the disclosure provides a water filter that can alleviate the drawback of the prior art.

The water filter includes a base seat, a filter that is disposed in the base seat, an outer shell that is coupled to the base seat and that covers the filter, and a fixing device.

The fixing device includes first and second curved members, a hinge unit, and a fixing module.

The first and second curved members are clipped on a junction between the base seat and the outer shell. Each of the first and second curved members has longitudinally-opposite first and second end portions, an inner curved surface that faces the junction between the base seat and the outer shell and that extends from the first end portion to the second end portion, and an outer curved surface that is opposite to the inner curved surface and that extends from the first end portion to the second end portion.

The hinge unit connects the second end portion of the first curved member and the first end portion of the second curved member such that the first and second curved members are pivotable relative to each other.

The fixing module includes a hook member that is mounted on the second end portion of the second curved member, and a fastener unit that is mounted on the first end portion of the first curved member. The fastener unit includes a handle member connected to the first end portion of the first curved member, and a ring member pivotally connected to the handle member and removably engaged with the hook member.

The handle member is pivotable relative to the first end portion of the first curved member between a fastened position, where the handle member is proximal to the outer curved surface of the first curved member, and where the first end portion of the first curved member and the second end portion of the second curved member are drawn to be proximal to each other so that the inner curved surfaces of the first and second curved members abut tightly against the junction between the base seat and the outer shell, and a released position, where the handle member is away from the outer curved surface of the first curved member, and where the ring member is permitted to be disengaged from the hook member to thereby release the first and second curved members from the junction between the base seat and the outer shell.

In a second aspect, the disclosure also provides a fixing device adapted for installing on a water filter. The water filter includes a base seat and an outer shell that is coupled to the base seat.

The fixing device includes first and second curved members, a hinge unit, and a fixing module.

The first and second curved members are adapted to be clipped on a junction between the base seat and the outer shell. Each of the first and second curved members has longitudinally-opposite first and second end portions, an inner curved surface that faces the junction between the base seat and the outer shell and that extends from the first end portion to the second end portion, and an outer curved surface that is opposite to the inner curved surface and that extends from the first end portion to the second end portion.

The hinge unit connects the second end portion of the first curved member and the first end portion of the second curved member such that the first and second curved members are pivotable relative to each other.

The fixing module includes a hook member that is mounted on the second end portion of the second curved member, and a fastener unit that is mounted on the first end portion of the first curved member. The fastener unit includes a handle member connected to the first end portion of the first curved member, and a ring member pivotally connected to the handle member and removably engaged with the hook member.

The handle member is pivotable relative to the first end portion of the first curved member between a fastened position, where the handle member is proximal to the outer curved surface of the first curved member, and where the first end portion of the first curved member and the second end portion of the second curved member are drawn to be proximal to each other so that the inner curved surfaces of the first and second curved members abut tightly against the junction between the base seat and the outer shell, and a released position, where the handle member is away from the outer curved surface of the first curved member, and where the ring member is permitted to be disengaged from the hook member to thereby release the first and second curved members from the junction between the base seat and the outer shell.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
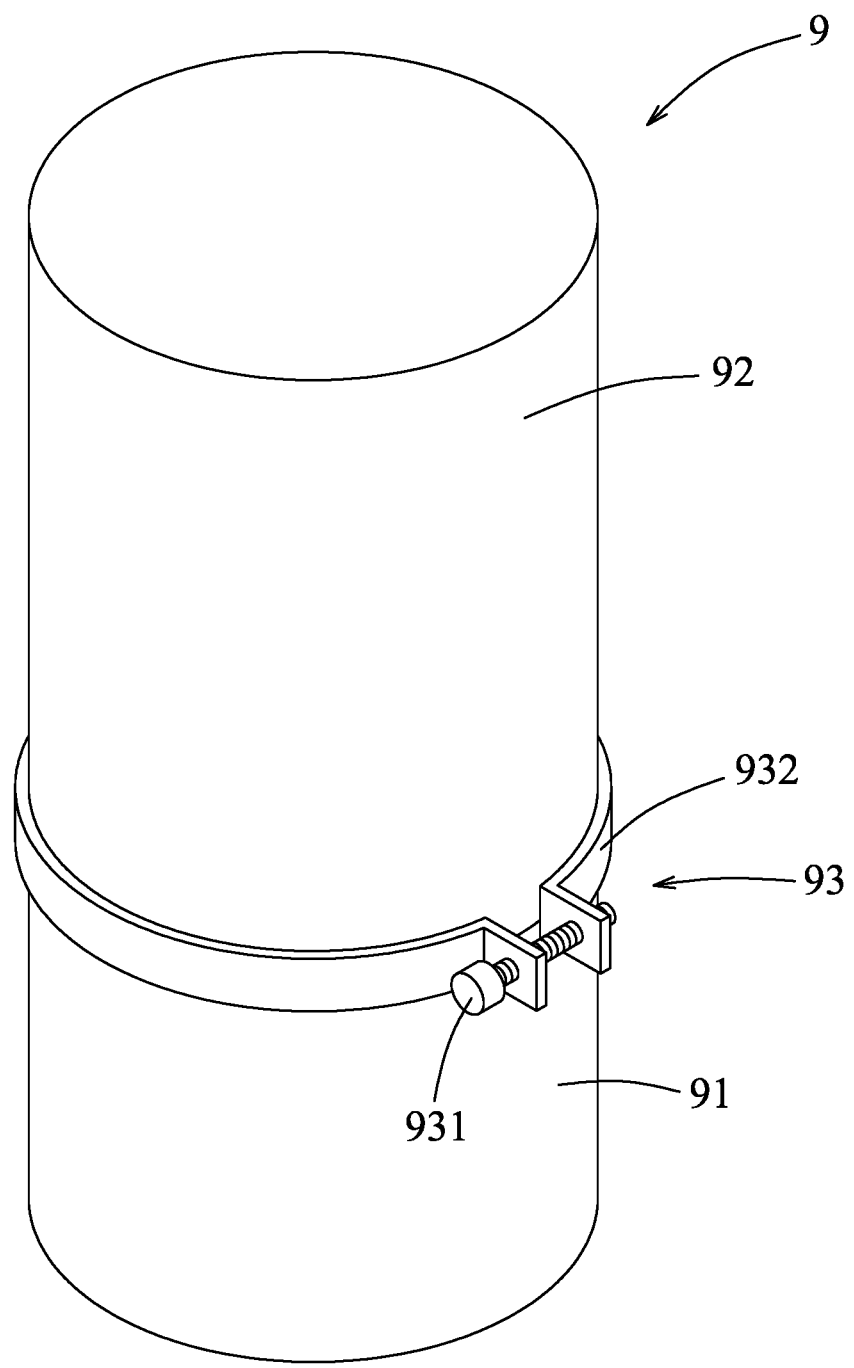
FIG. 1 is a perspective view of a conventional water filter.
Figure 2:
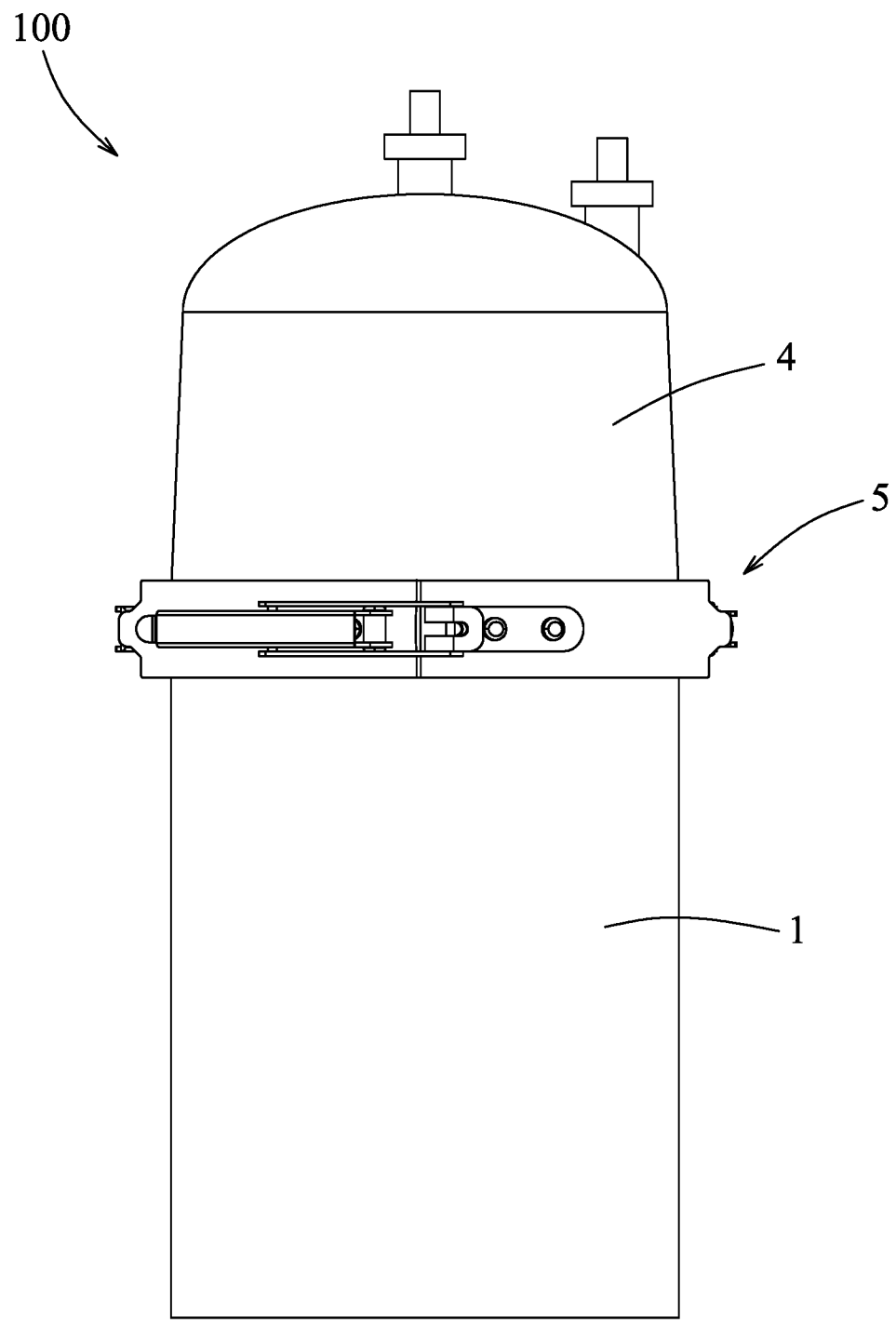
FIG. 2 is a side view of an embodiment of a water filter according to the disclosure.
Figure 3:
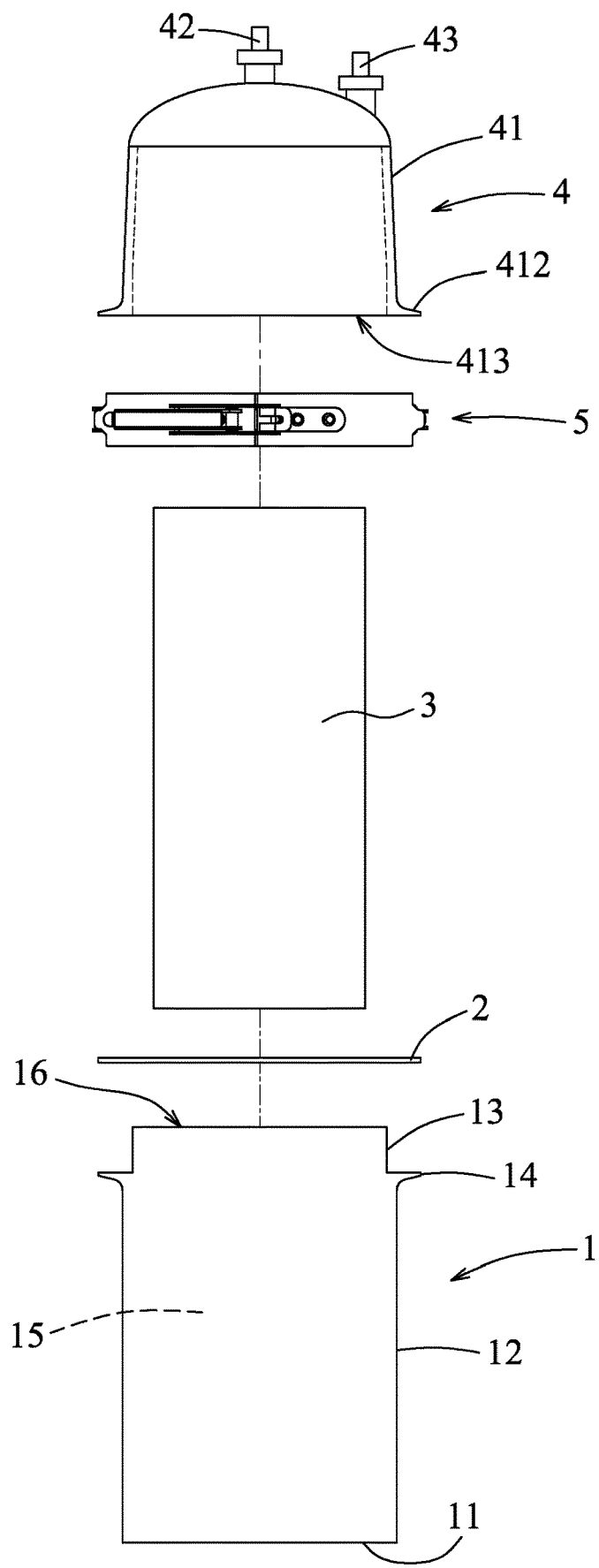
FIG. 3 is an exploded side view of the embodiment.

Referring to FIGS. 2 and 3, an embodiment of a water filter 100 according to the present disclosure includes a base seat 1, a sealing ring 2, a filter cartridge 3 that is disposed in the base seat 1, an outer shell 4 that is coupled to the base seat 1 and that covers the filter cartridge 3, and a fixing device 5.

The base seat 1 includes a base wall portion 11, a hollow main body portion 12, a connecting body portion 13 and an abutment wall portion 14. The base wall portion 11 is substantially circular. The main body portion 12 extends from a periphery of the base wall portion 11, and cooperates with the base wall portion 11 to define a receiving space 15. The connecting body portion 13 is connected to a top edge of the main body portion 12 and defines a seat opening 16 that is in spatial communication with the receiving space 15. The abutment wall portion 14 extends outwardly from the top edge of the main body portion 12. In this embodiment, the base 1 seat is made of stainless steel.

The sealing ring 2 surrounds the connecting body portion 13 and abuts against a top surface of the abutment wall portion 14. The filter cartridge 3 is disposed in the receiving space 15 through the seat opening 16.

The outer shell 4 has a shell body 41, a water input portion 42 and a water output portion 43. In this embodiment, the shell body 41 is substantially bell-shaped, is made of stainless steel, and has a protruding rim portion 412 that protrudes outwards and that defines a shell opening 413. An internal space of the shell body 41 is frustoconical and gradually converges in a direction away from the shell opening 413. The outer shell 4 is coupled to the base seat 1 with the connecting body portion 13 of the base seat 1 being inserted fittingly into the outer shell 4 through the shell opening 413 and with the protruding rim portion 412 of the shell body 41 being adjacent to the abutment wall portion 14 of the base seat 1 and cooperating with the abutment wall portion 14 to clamp the sealing ring 2 therebetween. The water input portion 42 and water output portion 43 are adapted for connecting respectively to tubes so that water may enter the filter cartridge 3 through the water input portion 42 and exit through the water output portion 43.

Figure 4:
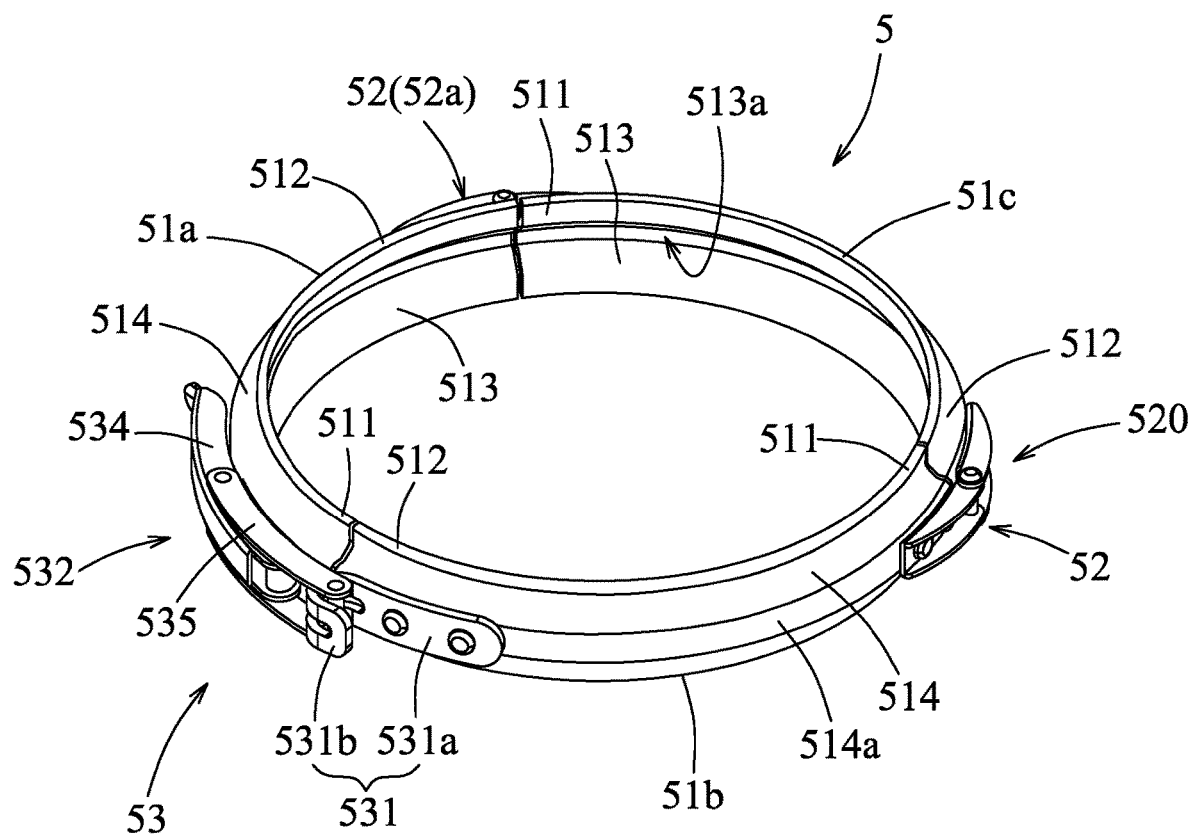
FIG. 4 is a perspective view of a fixing device of the embodiment.
Figure 5:
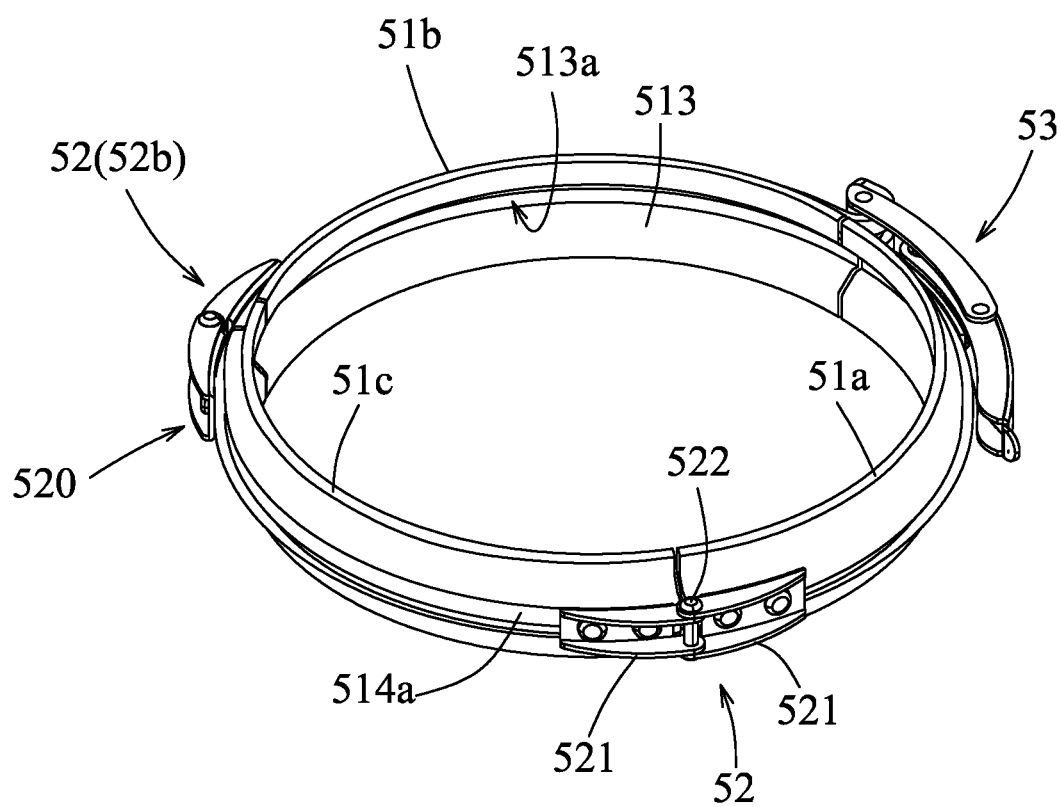
FIG. 5 is another perspective view of the fixing device from a different angle.
Figure 6:
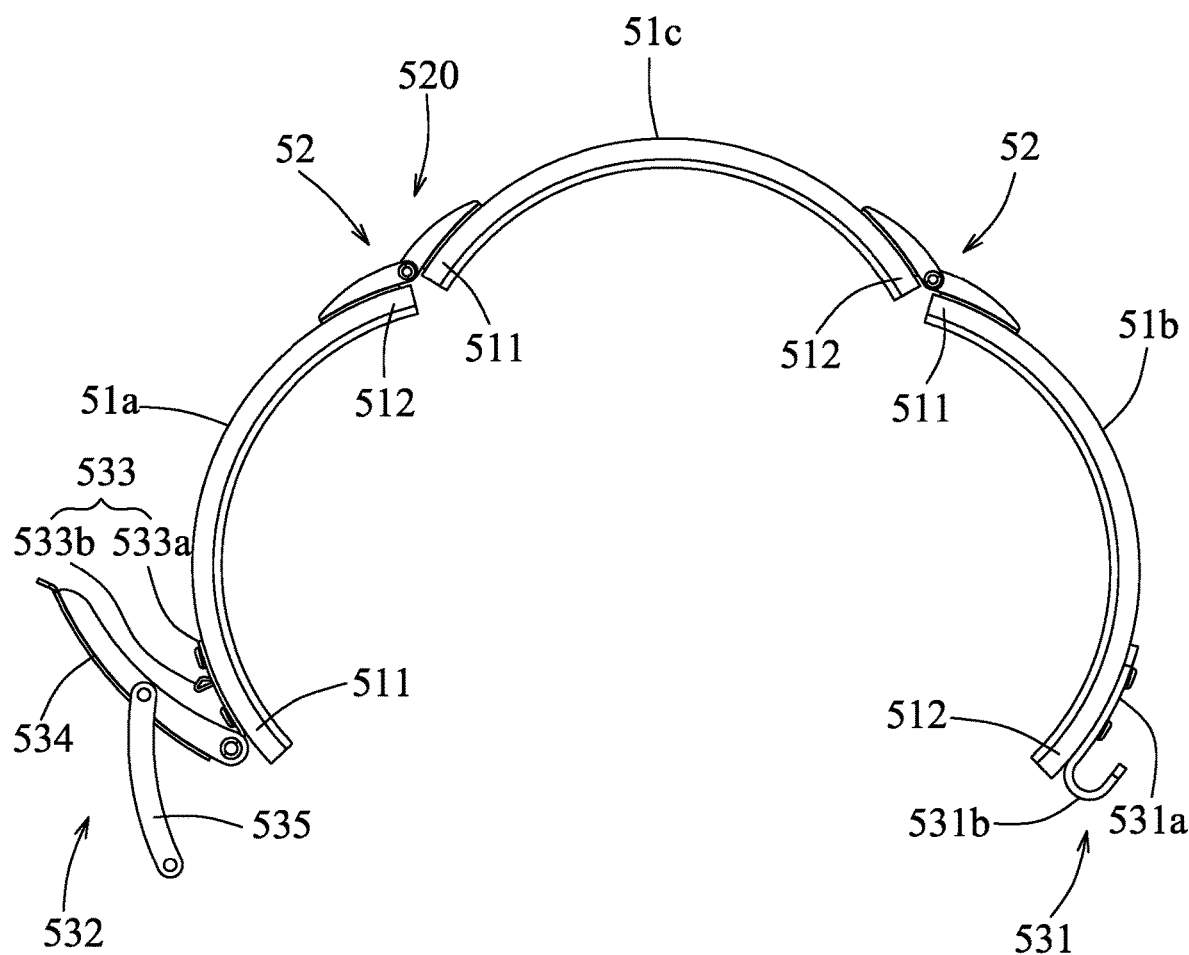
FIG. 6 is a side view of the fixing device, illustrating three curved members being pivotably connected to each other.

Further referring to FIGS. 4 to 6, in this embodiment, the fixing device 5 includes first, second and third curved members 51a, 51b, 51c, a hinge unit 520, and a fixing module 53. The first, second, and third curved members 51a, 51b, 51c cooperatively form an annular structure that is clipped on a junction between the abutment wall portion 14 of the base seat 1 and the protruding rim portion 412 of the outer shell 4 so as to secure the outer shell 4 onto the base seat 1. The third curved member 51c is disposed between the first and second curved members 51a, 51b. Each of the first, second and third curved members 51a, 51b, 51c has longitudinally-opposite first and second end portions 511, 512, and inner and outer curved surfaces 513, 514. The inner curved surface 513 faces the junction between the abutment wall portion 14 of the base seat 1 and the protruding rim portion 412 of the outer shell 4, and extends from the first end portion 511 to the second end portion 512. The outer curved surface 514 is opposite to the inner curved surface 513 and extends from the first end portion 511 to the second end portion 512. The inner curved surface 513 is formed with a groove 513a that corresponds in shape to the combined structure of the abutment wall portion 14 and the protruding rim portion 412. The outer curved surface 514 has a rib 514a.

The hinge unit 520 includes two hinge modules 52. Each of the hinge modules 52 includes two connecting seats 521 and a pivot pin 522 interconnecting the connecting seats 521. One of the hinge modules 52 connects the second end portion 512 of the first curved member 51a and the first end portion 511 of the third curved member 51c such that the first and third curved members 51a, 51c are pivotable relative to each other. The two connecting seats 521 of the one of the hinge modules 52 are mounted respectively on the second end portion 512 of the first curved member 51a and the first end portion 511 of the third curved member 51c.

The other one of the hinge module 52 connects the second end portion 512 of the third curved member 51c and the first end portion 511 of the second curved member 51b such that the third and second curved members 51c, 51b are pivotable relative to each other. The two connecting seats 521 of the other one of the hinge modules 52 are mounted respectively on the second end portion 512 of the third curved member 51c and the first end portion 511 of the second curved member 51b. All of the connecting seats 521 are mounted onto the ribs 514a of the corresponding one of the first, second and third curved members 51a, 51b, 51c. It should be noted that in other embodiments, the fixing device 5 may contain only the first and second curved members 51a, 51b and the hinge unit 520 may include only one hinge module 52, with the two connecting seats 521 of the hinge module 52 being mounted respectively on the second end portion 512 of the first curve member 51a and the first end portion 511 of the second curved member 51b.

The fixing module 53 is for fixing the first end portion 511 of the first curved member 51a to the second end portion 512 of the second curved member 51b, and includes a hook member 531 that is mounted on the second end portion 512 of the second curved member 51b, and a fastener unit 532 that is mounted on the first end portion 511 of the first curved member 51a. In this embodiment, the hook member 531 has a base portion 531a mounted to the second end portion 512 of the second curved member 51b, and a hook portion 531b that extends from the base portion 521a and hooks backwards. In other embodiments, the hook member 531 may be formed as one piece with the second end portion 512 of the second curved member 51b. The shape of the hook member 531 is not limited so long as removable engagement with the fastener unit 532 is permitted.

The fastener unit 532 includes a base plate 533, a handle member 534 connected to the first end portion 511 of the first curved member 51a, and a ring member 535 pivotally connected to the handle member 534 and removably engaged with the hook member 531.

Figure 7:
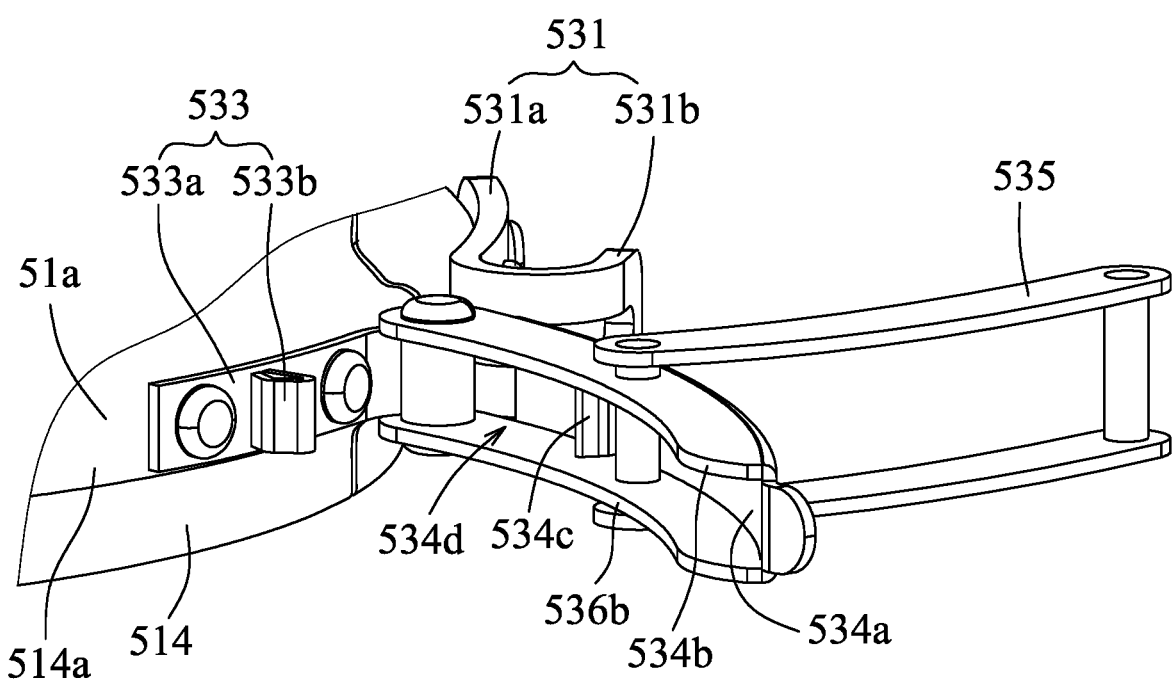
FIG. 7 is a fragmentary perspective view, showing a fixing module of the fixing device.

Further referring to FIG. 7, the base plate 533 has a plate body 533a mounted to the rib 514a of the first curved member 51a and disposed at the first end portion 511 of the first curved member 51a, and a securing portion 533b formed on an outer surface of the plate body 533a.

The handle member 534 has a first handle wall 534a, two second handle walls 534b extending respectively from opposite curved edges of the first handle wall 534a and cooperating with the first handle wall 534a to define a receiving space 534d, and an engaging portion 534c disposed in the receiving space 534d and formed at the first handle wall 534a. The handle member 534 is connected to an end of the plate body 533a which is proximal to the second curved member 51b, and is pivotable relative to the first end portion 511 of the first curved member 51a between a fastened position (see FIG. 4) and a released position (see FIG. 7). In other embodiments, the handle member 534 may be directly and pivotally connected to the first end portion of the first curved member 51a instead.

At the fastened position, the handle member 534 is proximal to the outer curved surface 514 of the first curved member 51a, and the first end portion 511 of the first curved member 51a and the second end portion 512 of the second curved member 51b are drawn to be proximal to each other so that the inner surfaces 513 of the first and second curved members 51a, 51b abut tightly against the junction between the base seat 1 and the outer shell 4. When the handle member 534 is at the fastened position, the securing portion 533b extends into the receiving space 534d and is engaged with the engaging portion 534c to secure the handle member 534 onto the first curved member 51a.

At the released position, the handle member 534 is away from the outer curved surface 514 of the first curved member 51a with the securing portion 533b of the base plate 533 being disengaged from the receiving space 534d of the handle member 534, and the ring member 535 is permitted to be disengaged from the hook member 531 to thereby release the first and second curved members 51a, 51b from the junction between the base seat 1 and the outer shell 4.

In sum, the embodiment of the water filter 100 of the disclosure provides the fixing module 53 including the handle member 534 that may be easily operated to engage the ring member 535 with the hook member 531 or to disengage the ring member 535 from the hook member 531, so that the fixing device 5 may be fixed to or removed from the water filter 100 relatively easier compared to the mechanism used in the abovementioned conventional water filter.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A water filter comprising:
a base seat;
a filter cartridge that is disposed in said base seat, wherein said filter cartridge filters water;
an outer shell that is coupled to said base seat and that covers said filter cartridge; and
a fixing device that includes:
first and second curved members clipped on a junction between said base seat and said outer shell, each of said first and second curved members having longitudinally-opposite first and second end portions, an inner surface that faces the junction between said base seat and said outer shell and that extends from said first end portion to said second end portion, and an outer surface that is opposite to said inner surface and that extends from said first end portion to said second end portion,
a hinge unit connecting said second end portion of said first curved member and said first end portion of said second curved member such that said first and second curved members are pivotable relative to each other, and
a fixing module including:
a hook member that is mounted on said second end portion of said second curved member, and
a fastener unit that is mounted on said first end portion of said first curved member, and that includes a handle member connected to said first end portion of said first curved member, and a ring member pivotally connected to said handle member and removably engaged with said hook member,
wherein said handle member is pivotable relative to said first end portion of said first curved member between a fastened position, where said handle member is proximal to said outer surface of said first curved member, and where said first end portion of said first curved member and said second end portion of said second curved member are drawn to be proximal to each other so that said inner surfaces of said first and second curved members abut tightly against the junction between said base seat and said outer shell, and a released position, where said handle member is away from said outer surface of said first curved member, and where said ring member is permitted to be disengaged from said hook member to thereby release said first and second curved members from the junction between said base seat and said outer shell,
wherein said outer shell has a protruding rim portion that defines a shell opening;
wherein said base seat includes:
a hollow main body portion,
a connecting body portion that is connected to a top edge of said main body portion and that is inserted fittingly into said outer shell through said shell opening, and
an abutment wall portion that extends outwardly from said top edge of said main body portion and that is adjacent to said protruding rim portion of said outer shell, and
wherein said first and second curved members are clipped on the junction between said abutment wall portion of said base seat and said protruding rim portion of said outer shell.

2. The water filter as claimed in claim 1, wherein:
said fixing device further includes a third curved member disposed between said first and second curved members and having longitudinally-opposite first and second end portions;
said hinge unit includes two hinge modules, one of said hinge modules connecting said second end portion of said first curved member and said first end portion of said third curved member such that said first and third curved members are pivotable relative to each other, the other one of said hinge module connecting said second end portion of said third curved member and said first end portion of said second curved member such that said third and second curved members are pivotable relative to each other.

3. The water filter as claimed in claim 2, wherein:
the one of said hinge modules includes two connecting seats mounted respectively on said second end portion of said first curved member and said first end portion of said third curved member, and a pivot pin interconnecting said connecting seats; and
the other one of said hinge modules includes two connecting seats mounted respectively on said second end portion of said third curved member and said first end portion of said second curved member, and a pivot pin interconnecting said connecting seats.

4. The water filter as claimed in claim 1, wherein:
said fastener unit further includes a securing portion mounted to said first end portion of said first curved member and connected to said outer surface of said first curved member;
said handle member has a first handle wall, two second handle walls extending respectively from opposite curved edges of said first handle wall and cooperating with said first handle wall to define a receiving space, and an engaging portion disposed in said receiving space and formed at said first handle wall; and
when said handle member is at the fastened position, said securing portion extends into said receiving space and is engaged with said engaging portion to secure said handle member onto said first curved member.

5. The water filter as claimed in claim 4, wherein said fastener unit further includes a base plate mounted to said first end portion of said first curved member and connected to said outer surface of said first curved member, said handle member being pivotally connected to said base plate.

6. The water filter as claimed in claim 5, wherein said base plate has a plate body, said handle member being pivotally connected to an end of said plate body which is proximal to said second curved member, said securing portion being formed on an outer surface of said plate body.

* * * * *